Figure 1:
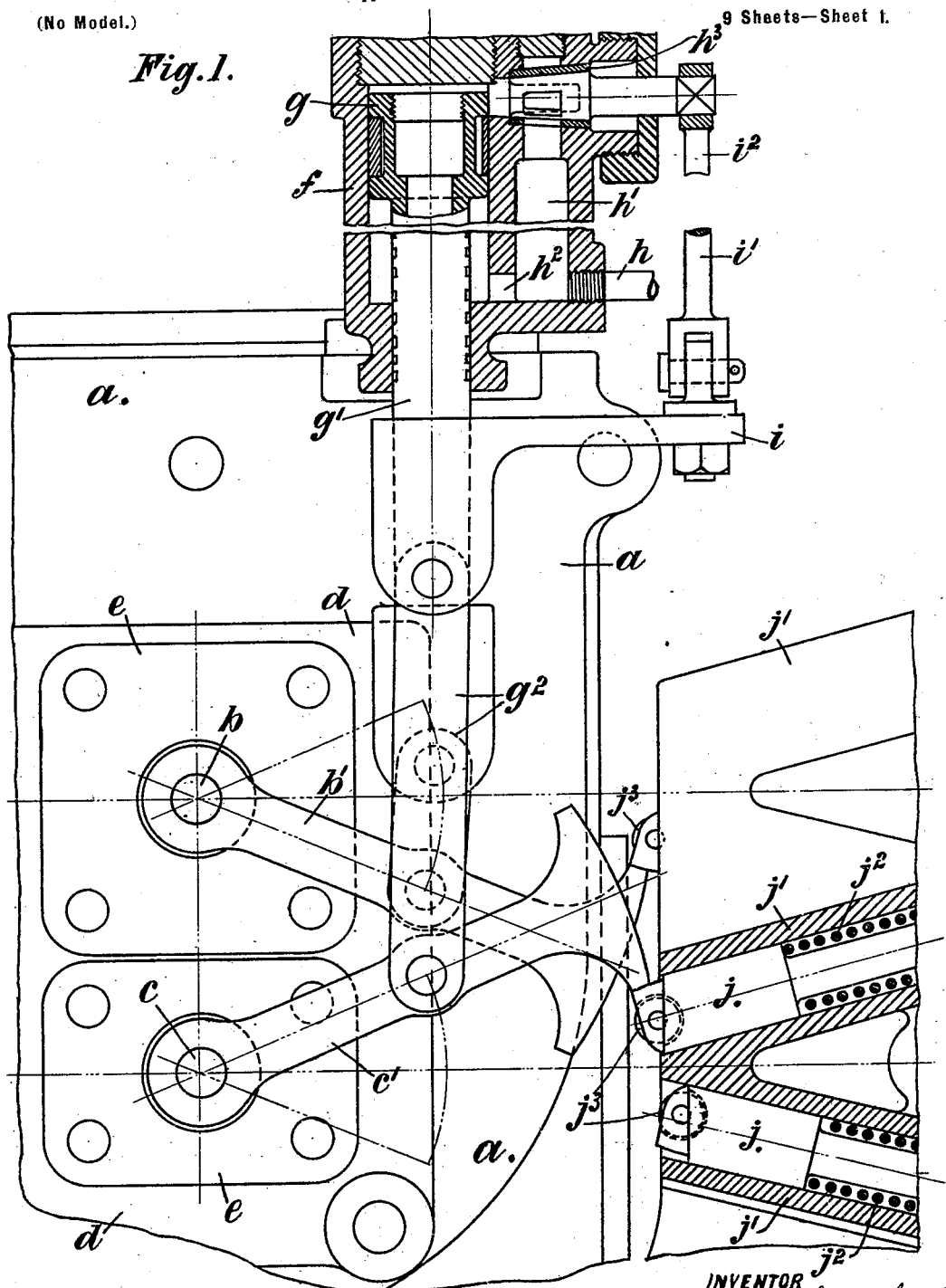

No. 711,939. Patented Oct. 28, 1902.
J. A. COOMBS.
VALVE MECHANISM FOR COMPRESSORS.
(Application filed Oct. 2, 1900.)
(No Model.) 9 Sheets—Sheet 1.

WITNESSES:

INVENTOR
James Alger Coombs
BY Richards
ATTORNEYS

THE NORRIS PETERS CO., PHOTO-LITHO., WASHINGTON, D. C.

No. 711,939. Patented Oct. 28, 1902.
J. A. COOMBS.
VALVE MECHANISM FOR COMPRESSORS.
(Application filed Oct. 2, 1900.)
(No Model.) 9 Sheets—Sheet 2.

WITNESSES:
Ella L. Giles

INVENTOR
James Alger Coombs
BY Richardson
ATTORNEYS

No. 711,939. Patented Oct. 28, 1902.
J. A. COOMBS.
VALVE MECHANISM FOR COMPRESSORS.
(Application filed Oct. 2, 1900.)
(No Model.) 9 Sheets—Sheet 4.

No. 711,939. Patented Oct. 28, 1902.
J. A. COOMBS.
VALVE MECHANISM FOR COMPRESSORS.
(Application filed Oct. 2, 1900.)
(No Model.)
9 Sheets—Sheet 8.

WITNESSES:

INVENTOR.
James Alger Coombs
BY
ATTORNEYS.

No. 711,939. Patented Oct. 28, 1902.
J. A. COOMBS.
VALVE MECHANISM FOR COMPRESSORS.
(Application filed Oct. 2, 1900.)

(No Model.) 9 Sheets—Sheet 9.

WITNESSES:
INVENTOR.
James Alger Coombs.
BY
ATTORNEYS

UNITED STATES PATENT OFFICE.

JAMES ALGER COOMBS, OF LLANGOLLEN, ENGLAND.

VALVE MECHANISM FOR COMPRESSORS.

SPECIFICATION forming part of Letters Patent No. 711,939, dated October 28, 1902.

Application filed October 2, 1900. Serial No. 31,778. (No model.)

*To all whom it may concern:*

Be it known that I, JAMES ALGER COOMBS, a subject of the Queen of England, and a resident of Llangollen, in the county of Denbigh, Wales, England, have invented certain new and useful Improvements in Valve Mechanism for Compressors, of which the following is a specification.

This invention has reference mainly to air and other gaseous-fluid compressors and motors for operating on or operated by compressed air or other gaseous-fluid pressure, (including steam,) and for convenience the invention will be generally described as applied to these purposes.

The invention has primarily for its object and effect, among other things, to provide improvements in connection with valve-gears or mechanisms and valves for compressors and motors by which valves of the sliding type (either with rectilinear or circular motion) can be employed for the inlet and outlet of the fluid to and from its cylinders with a relatively small amount of friction and without a high rate of wear of the valve-seats and valve-faces, even when the fluid worked on or the working fluid is of high temperature and pressure and the velocities of the moving parts are high, and thereby greatly extending the time which the valves will work truly upon their faces and give a fluid-tight joint; and at the same time it has, further, for its object to enable an engine or machine with my improvements and mechanisms to be applied or used alternatively either as a compressor or as a motor (operating on or operated by air, steam, or the like) and to accomplish other advantageous effects, as hereinafter specified or referred to.

According to this invention the effects and purposes thereof are accomplished partly by employing separate valves for the inlet and outlet of the fluid operated upon or used, both being positively operated by moving such valves only at or about the time when said valves are practically or nearly in equilibrium—that is to say, when the pressures on their opposite sides, (that is, inside the cylinders and outside them,) are substantially or nearly equal—while at other times when the pressures are substantially different and the slide-valves are being pressed upon their seats and at the moment of greatest pressure they are adapted to be stationary, and also partly by the employment of cam or tappet gear or mechanism employed for directly operating (or indirectly, as hereinafter described) the said slide-valves, the use of such gear or mechanism being to a large extent rendered permissible and practicable and highly efficient by the aforenamed characteristic—namely, that of the method of operating the valves mechanically when they are practically in equilibrium.

In a compressor or motor according to this invention a separate slide-valve or set of valves are used for the inlet of the gaseous fluid and for the outlet or exhaust for each end of the cylinder, the valves being arranged on the cylinder casings or covers to give a minimum clearance, the valves being operated in such a way that there is at no time any great force required to move them. They can be made very thin, thus in case of inlet-valve reducing the clearance, and according to one construction the valves are of the type having circular oscillating motion—that is, they have a plurality of openings through them—while the valve-seats are similarly or correspondingly formed, and they may be arranged conveniently in the cover of the cylinders.

The invention will be described with reference to the accompanying drawings, which illustrate it.

Figure 2:
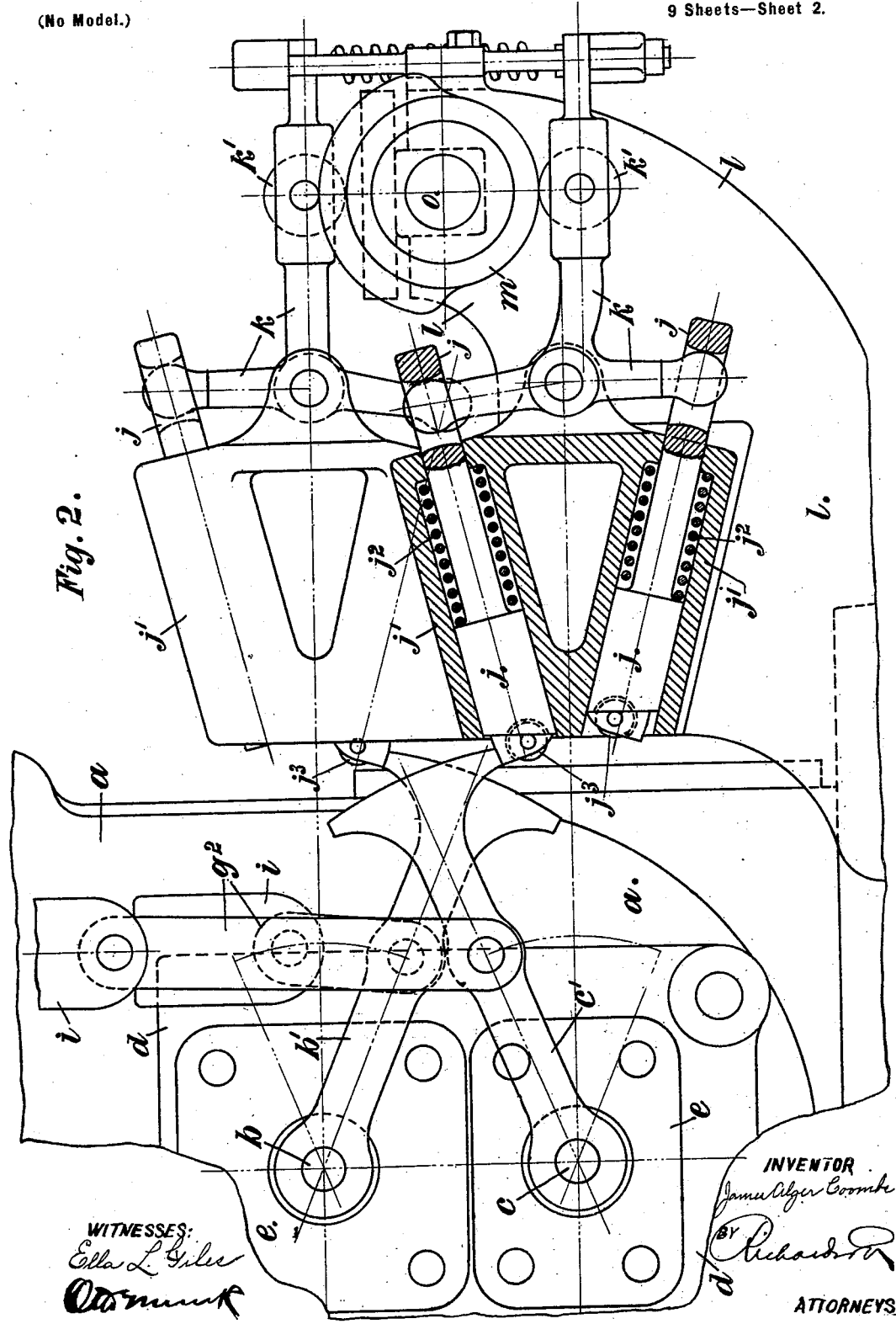
Figure 3:
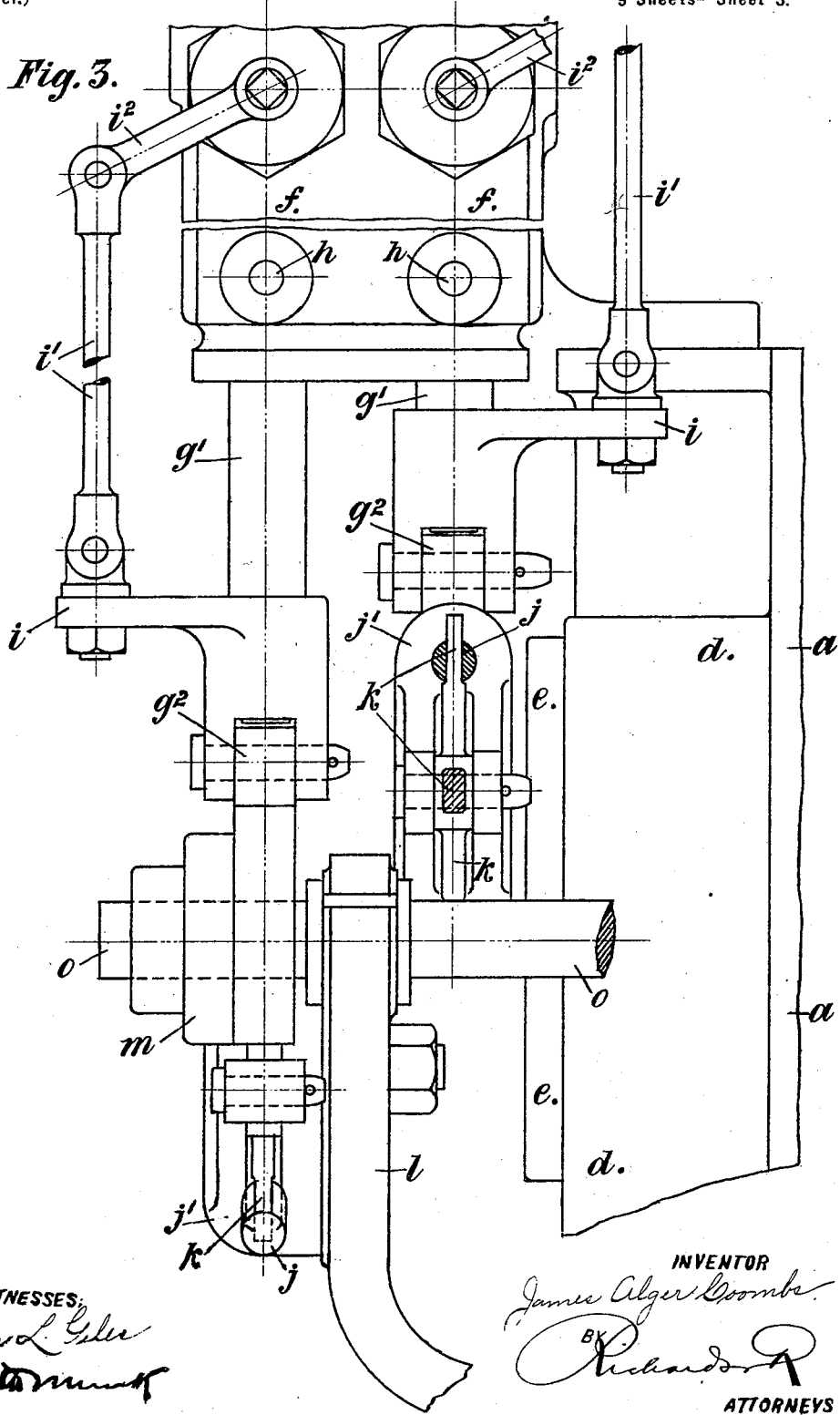
Figure 4:
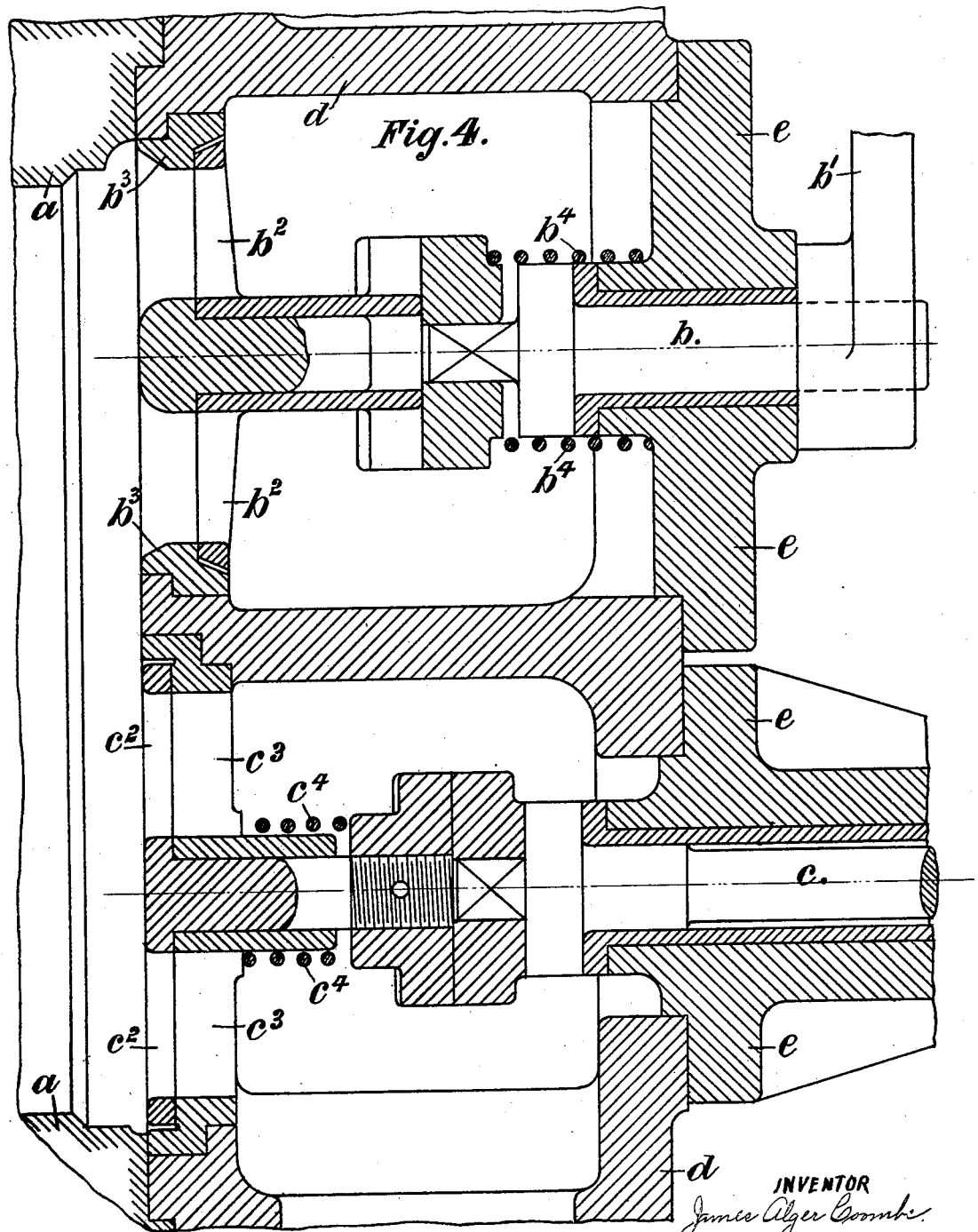
Figure 5:
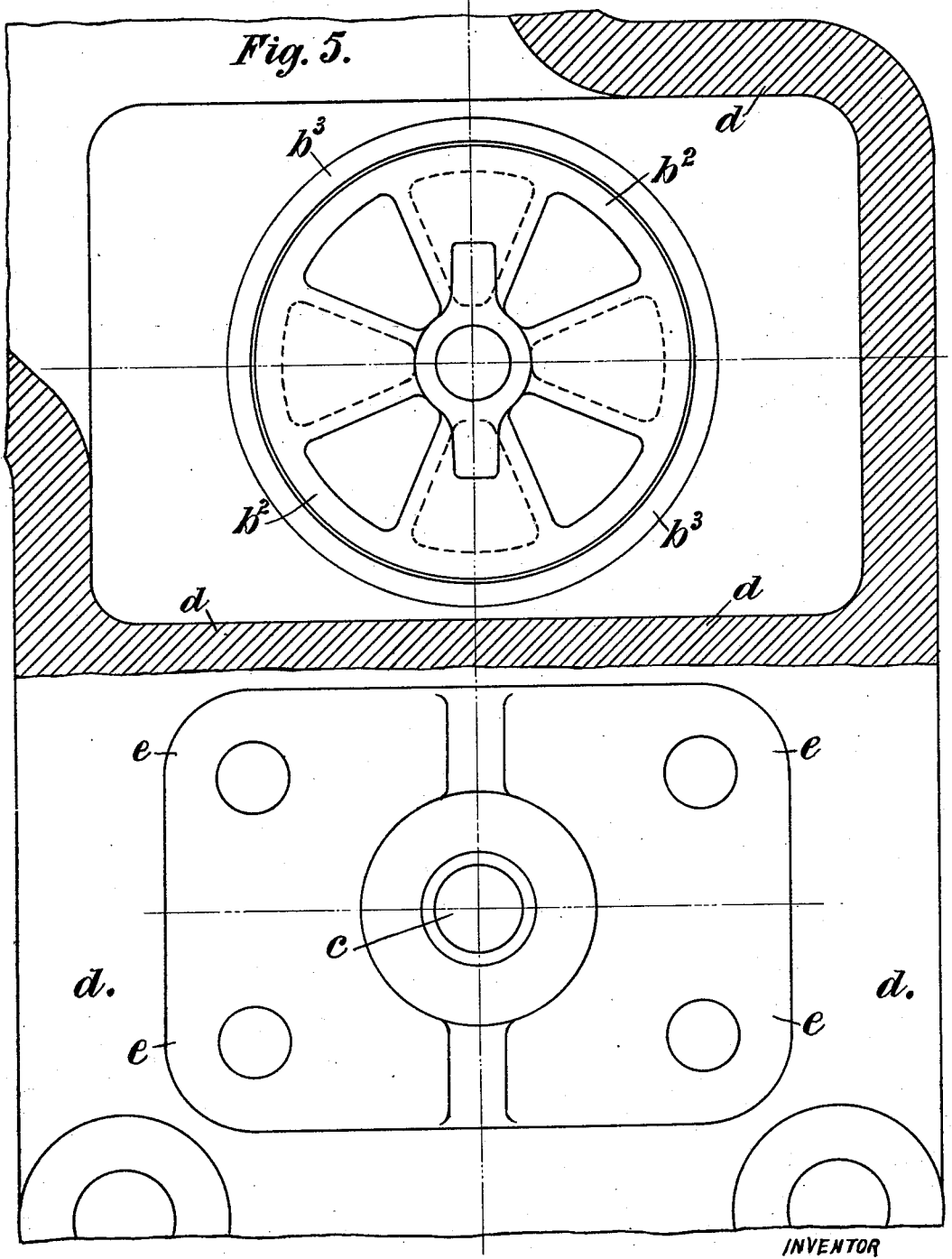
Figure 6:
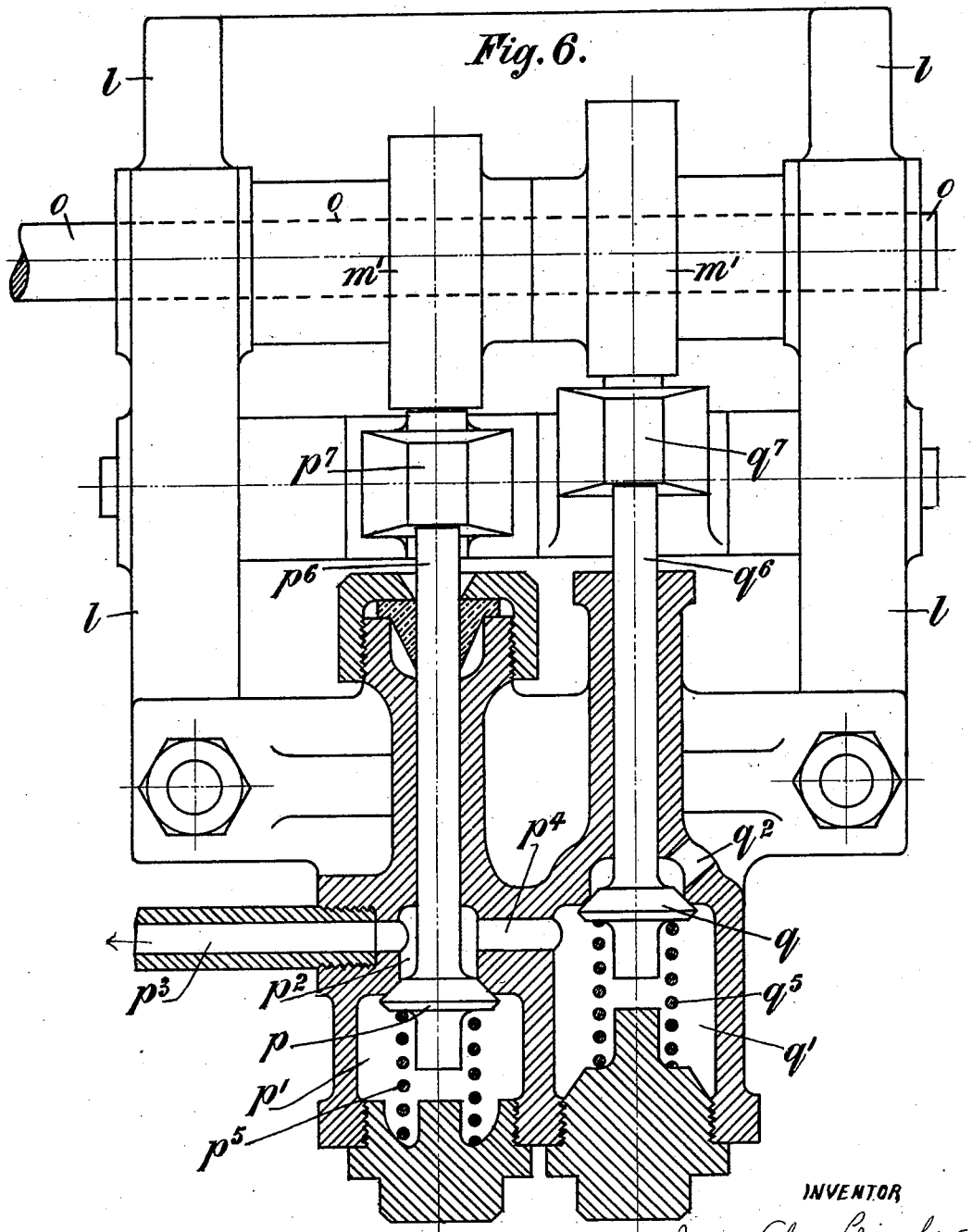
Figure 7:
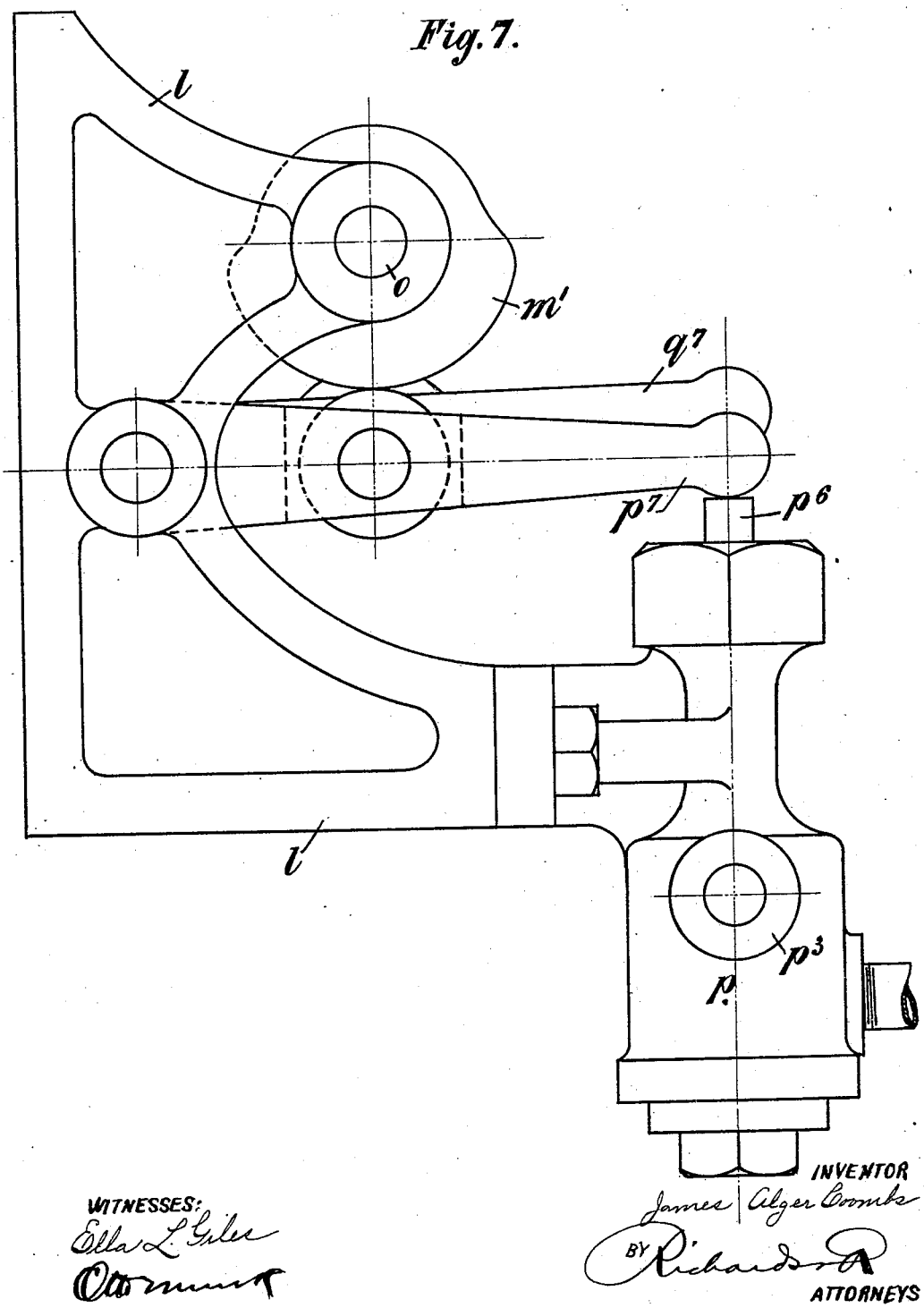
Figure 8:
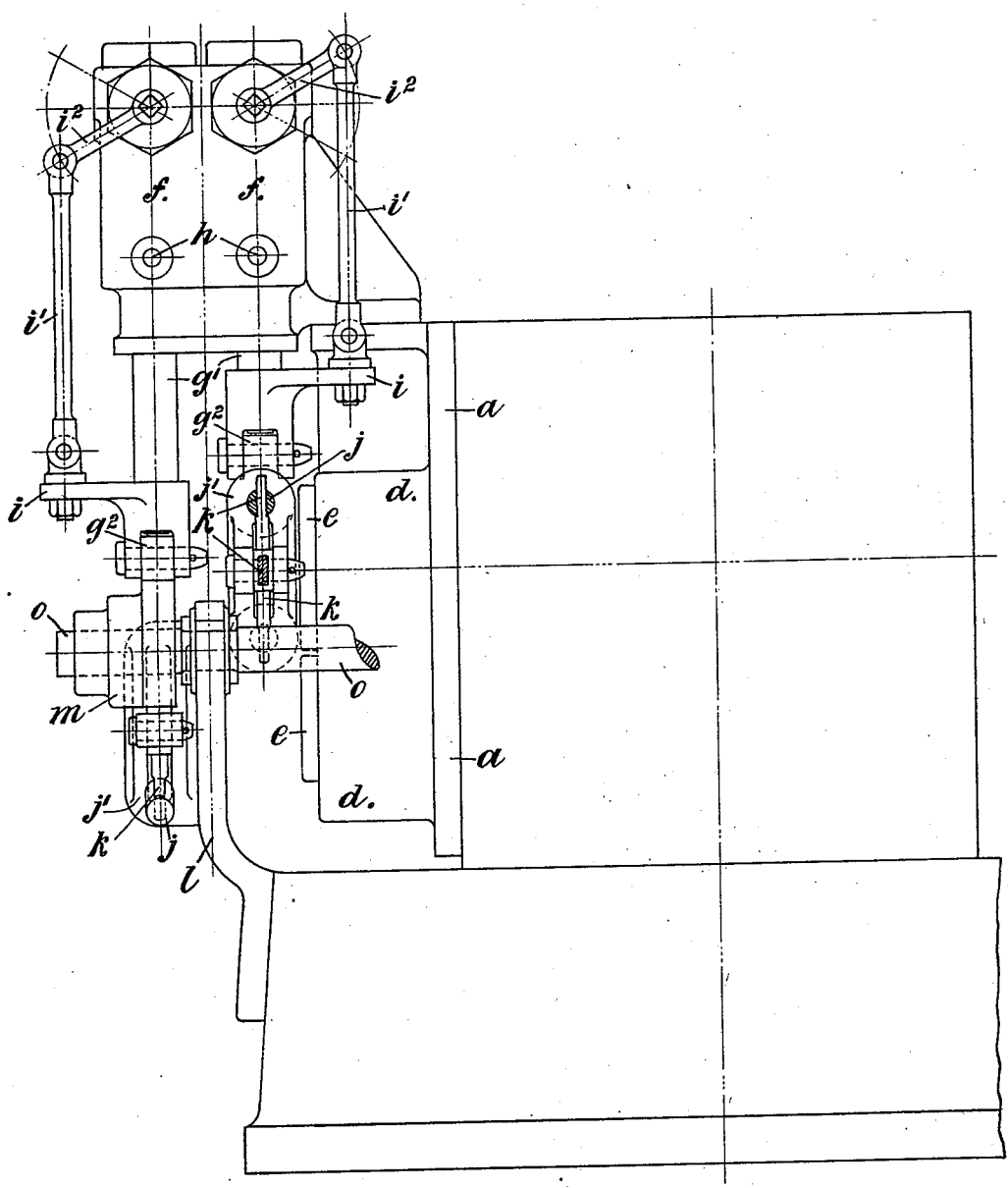
Figure 9:
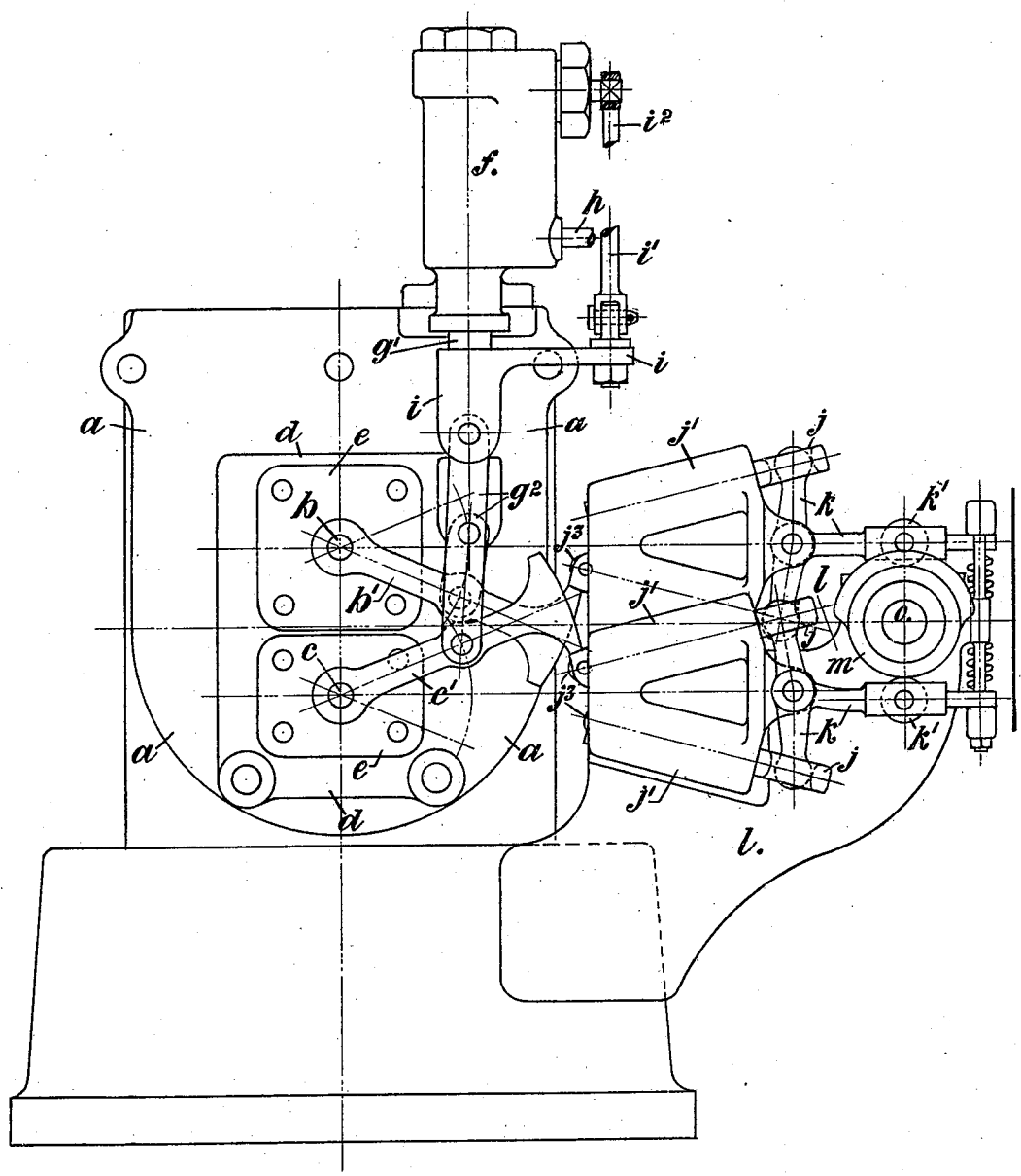

Figure 1 is an end elevation, partly in section, of a compressor or motor and a valve mechanism according to the invention. Fig. 2 is an end elevation showing further parts of the mechanism which operate with those shown in Fig. 1. Fig. 3 is a side elevation showing the mechanism, and Fig. 4 is a sectional elevation illustrating the construction of the inlet and outlet valves of the compressor or motor cylinder; and Fig. 5 is an end view, partly in section, of same. Figs. 6 and 7 are end and side elevations, respectively, showing a modification of the valve-actuating mechanism. Figs. 8 and 9 are side and end elevations of the complete apparatus.

In the mechanism in the drawings the valves of the compressor or motor, as the case may be, are not directly operated through cams, but partly by cams and partly by an auxiliary valve-actuating piston and cylinder operated by compressed air—that is, the cams do not actually operate the valves, but control or rectify their movement by controlling the action of the valve-actuating piston, which is directly connected with them and operates them; but other modifications and arrangements of this mode of operating the valves are hereinafter described and illustrated.

It will be convenient to assume that in the machinery illustrated the improvements hereunder are applied to an air-compressor.

Referring to the drawings, $a$ represents a part of one end of the compressor, and $b$ and $c$ denote the spindles of the outlet and inlet valves, respectively.

$o$ is the cam-shaft of the compressor, running parallel with the axis of the cylinder $a$.

$d$ is the cylinder valve-box, and $e$ represents the covers fitting over the openings in the face of the valve-box $d$ and supporting or serving as bearings to the spindles $b$ and $c$ of the valves.

The two small cylinders, which are operated by the compressed air and operate the valves, are designated $f$ and are mounted upon the end of the cylinder $a$, as shown more clearly in Fig. 3. $g$ represents the pistons of these cylinders, and $g'$ represents the piston-rods, one of these being connected to the lever $b'$ of the valve-spindles $b$ and the other to the lever $c'$ of the spindle $c$ through links $g^2$. The piston-rods $g'$ of the cylinders $f$ are made large, as shown, in order to limit the area of the piston exposed at this end of the cylinder and to make it considerably less than the area exposed to the other end, which is the whole disk or face of the piston.

Compressed air is admitted to the cylinders $f$ from a suitable reservoir—say from a reservoir to which the air is pumped by an auxiliary small separate compressor—and it enters through a pipe $h$ into a chamber $h'$ on each of the cylinders, whence it passes by a passage $h^2$ into the lower ends of the cylinders. With this part of the cylinder it has constant communication. With regard to the upper part of the cylinder $f$, however, the air is controlled by a hollow plug air-distributing valve $h^3$, which controls the communication between the chamber $h'$ and the top of the cylinder $f$. In action when the valve $h^3$ is so moved that the chamber $h'$ and the upper part of cylinder $f$ are in communication and compressed air is admitted to the cylinder the piston $g$ will be pressed down, the pressure on the annular under surface of the piston acting in the opposite direction being of course less than that acting downward, and is consequently overcome. When, however, the valve $h^3$ is turned and the communication between the top of the cylinder $f$ and the chamber $h'$ is cut off and communication between $f$ and the atmosphere by means of this valve established, the pressure of air acting on the annular lower face of the piston $g$ will force it upward in the opposite direction. The valve-actuating mechanisms of the two valves are quite independent of each other, and consequently can and do move entirely independently of each other. Each of the valves $h^3$ of the cylinders $f$ is operated through a cross-head $i$ on the piston-rods $g'$ and connecting rod $i'$ and arm or lever $i^2$ on the shank of the valve $h^3$, and thus they are opened and shut as and when the pistons move.

As above stated, the pistons $g$ and cylinders $f$ actually move the valve-levers $b'$ $c'$ and the valves $b^2$ $c^2$, and the cams $m$ control such movement. This is effected through the releasing or trip gear or mechanism shown—namely, in connection with each of the levers $b'$ $c'$ there are two detents $j$ working in connection with the ends of the levers $b'$ $c'$ (which are made in T form) and operated from the cams $m$ through double bell-crank levers $k$. The detents $j$, connected with each of the levers, work in a casing $j'$, mounted on the side of a bracket $l$, which also supports the cam-shaft $o$, and the two ends of two of the arms of the double bell-crank levers $k$ engage with the shanks of the detents which lie outside the casings $j'$, and they are normally pressed outward toward the levers $b'$ $c'$ by a spring $j^2$. Each lever $k$ has on it a roller $k'$, and each of these rollers is actuated by a cam $m$ on the shaft $o$. The action is that as the cam revolves one of the detents $j$ of each set is pulled in and the other pushed out by its spring $j^2$, and assuming that in the case of the one pulled in its nose was holding up one of the levers $b'$ or $c'$ then in this action the lever held up will have been released, and thus it is free to be pushed over to the opposite position by the piston $g$, connected with it. As this detent $j$ was withdrawn from the lever the other detent would be moving outward; but at this stage the end of the lever would be passing over the roller $j^3$ in the end of it, and so this detent would be held back in its case during this movement. During this time, however, the movement of the lever $k$ would not be stopped, as the opening in the end of the shank of the detent is longer than the width of the end of the lever $k$, which works in it.

The regulating-valves $h^3$ of the pneumatic cylinders $f$ are adapted to be opened and to admit compressed air to the upper end of said cylinders some time in advance of the time when the detents $j$, operated by the cams $m$, are adapted to free the pistons $g$ for their movement in this direction and allow said pistons to open the main valves $b^2$ $c^2$, and similarly the valves $h^3$ open the ends of the cylinders $f$ to the atmosphere in advance of the time when the detents are adapted to free the pistons $g$ for moving in the opposite or return directions and allow them to close said valves. The mode of action, therefore, is that the pneumatic cylinder $f$ will have lead—namely, the valve of the pneumatic cylinder will be opened and closed in advance of the time when the valves $b^2$ $c^2$ are required to be moved. By this means the action of the air admission and outlet valves $b^2$ $c^2$ would be very sudden, as the work and friction to be performed or overcome by the cams $m$ would be small, as it is merely a releasing operation. Hence the actual movement of the inlet and discharge valves will take place according to the actual setting of the cams upon its shaft, as these will be in lag in the operations, owing to the power to effect it being small, and it—the movement—will be prompt and true—that is, the movement of the valves will be simultaneous with the release of the levers $b'$ $c'$, and their release will take place truly according to the setting of the cams $m$.

The slide-valves shown in the drawings are of the circular reciprocating grid type adapted to vibrate about their axes—namely, the axes of the shafts $b$ and $c$. The delivery-valve is marked $b^2$ and the inlet-valve $c^2$, and their seats are respectively marked $b^3$ and $c^3$. Both the valves and their seats are made up of alternate solid portions and opening in the form of sectors of circles. When the solid portions of a valve lie over the openings in the seat, communication between the cylinder $a$ and the valve-case $d$ is cut off, and vice versa. The valve $b^2$ is on the inside of the seat $b^3$ and valve-box $d$, and the valve $c^2$ is on the outside of its seat $c^3$ and box $d$, and the former is pressed onto its seat by a spring $b^4$, while the latter is pulled up to and onto its seat by a spring $c^4$. These valves are not directly connected with their respective operating-spindles $b'$ $c'$, but are connected by a coupling of the kind known as the "Oldham" coupling, which enables the valve to rest freely and evenly on its seat and at the same time enables it to be rotated. The air-delivery valve $b^2$ will be operated—that is, its actuating mechanism set to operate—namely, open and close it—when the pressure inside the cylinder $a$ and the valve-box $d$ are equal, while the valve $c^2$ will be operated as the compressor-piston moves forward at the beginning of the stroke and the pressure on both valves of it equal—that is, these valves are only moved when they are in equilibrium. At other times they are stationary. Hence at all times when they are moved only a small force is required to do it. Also by reason of this fact they can be made very thin, and thus in the case of the inlet-valve clearance can be made very small, and, furthermore, as the faces of these valves are parallel with and lie in a plane very near that of the inner surface of the cylinder end the diminution of clearance is facilitated. Furthermore, as regards the valves $b^2$ $c^2$ they are constructed so as to be capable of being moved bodily off their seats, toward which they are normally pressed by springs, as stated, in the manner of lift-valves, and hence if there be a lack of compressed air for use in the pneumatic cylinders $f$ for operating the pistons $g$ thereof the compressor could still work and compress air, as the valves $b^2$ $c^2$ can lift automatically off their seats instead of being oscillated on them by the valve-operating mechanisms.

Furthermore, the delivery-valve being capable of being lifted off its seat it can act also as a relief-valve, as well as a discharge-valve, of the sliding type.

It has been stated above that the pneumatic cylinders $f$ are supplied with compressed air by a separate or auxiliary compressor; but in cases where the pressure of air forced by the main compressor is high the auxiliary compressor will not be required, and compressed air is supplied to the cylinders $f$ from a part of the main compressor or parts containing compressed air supplied by it.

A modified mode of effecting the operation of the oscillating slide-valves consists in working such valves directly from the auxiliary valve-actuating piston, the compressed air to these cylinders being distributed and controlled by valves worked by cams revolved by the main compressor or motor. This modification is illustrated in Figs. 6 and 7. In this case in the arrangement shown the shaft $o$, carrying the operating-cams and valve-cases in which these distributing-valves are located, is on the double bracket $l$, and the compressed air which they distribute to the auxiliary cylinders is supplied at high pressure by a separate auxiliary compressor or from the compressed-air service supplied by the main compressor. The air which is to be so distributed is employed in connection with the upper ends of the cylinders $f$, and there are two valves by which it is done, one of which, $p$, controls the supply of air from the compressed-air source of supply to the cylinders $f$ and the other, $q$, the exhaust from these cylinders. This compressed air is supplied to the valve-box $p'$, and from this box it passes to the cylinder $f$ by way of the chamber $p^2$ and pipe $p^3$, the chamber $p^2$, as regards the entrance of air to it, being governed by valve $p$. When air is to be supplied to the top of a cylinder $f$, the valve $p$ is opened, and when air is to be exhausted from it the valve $p$ is closed and the valve $q$ opened, the compressed air passing from the upper end of $f$ to the atmosphere through the box $p^2$, the passage $p^4$ forming the communication between $p^2$ and the valve-chest $q'$ and the opening $q^2$ in the valve-casing, which is normally controlled by this valve. In this exhausting action the valve $q$ is opened and $p$ closed, whereas when the valve $p$ is opened the valve $q$ is closed. When the top of the cylinder $f$ is so exhausted, the piston $g$ can move up and the reverse action be performed. This action is caused by compressed air in the bottom of the cylinder, a constant supply with the compressed-air service being obtained by a pipe connecting them together, and it takes place as soon as the valve $q$ is operated. The stems $p^6$ and $q'$ of the valves $p$ and $q$ are operated by the cams $m'$ through the interposition of levers $p^7$ and $q^7$, respectively, and both valves $p$ and $q$ are normally pressed onto their seats by springs $p^5$ and $q^5$, respectively.

The valve-spindles $b$ and $c$ of the main-cylinder inlet and outlet valves are simply connected to and worked by the head of the piston-rod $g$ through connecting-rods $g^2$.

The distributing-valve mechanisms above described will be employed in connection with each inlet or set of inlet valves and each delivery or set of delivery valves of the main cylinder; but probably more than one inlet and one delivery valve would be used at each end of the main compressor or motor cylinder, as the diameter of such cylinder will generally not be of the necessary size to take both inlet and outlet valves together with the piston-rod gland; but however many inlet and delivery valves there may be provided on any end of the cylinder all the inlet-valves and all the delivery-valves will be joined together, respectively, and a set of each will be operated by one set of cams and pneumatic cylinders. In the case of the application of the improvement to a compound or duplex steam-engine driving a stage or duplex air-compressor, with valves operated according to the mode herein set forth, a single cam-shaft $o$ would be sufficient for carrying the cams to control the opening and closing of all the valves, including the steam inlet and exhaust valve in both steam-cylinders and air inlet and delivery valves on both air-cylinders.

With regard to some of the advantages effected by this invention, one is that all valves being mechanically operated the compressors or motors may be driven at high speeds. Also by the use of the mechanisms described a very rapid opening and closing of the valves takes place and reduces wiredrawing to a minimum, and the opening and closing of valves at the right moment obviates "slip" in air-compressors, and thereby overcomes this defect, which is of great importance.

A further advantage in connection with air-compressors and in a less degree with steam-engines according to the present invention is that whereas with high pressure and temperatures proper lubrication of valves is very difficult, if not impossible, resulting, consequently, in rapid wear of the slide-valves and faces, as at present worked by my improvement—namely, by moving them when nearly in equilibrium and only then, they being stationary the rest of the time—proper lubrication is not difficult. Then, again, a further advantage is that my invention enables the same patterns and parts to be used alternatively for a compressor or motor, either for working on or with steam or air or other fluid, and provides that interchangeability of parts which is so desirable in engineering-work, the only necessary alterations between one and the other being the form and setting of the cams above referred to.

The invention has been described above mainly as applied, in the case of compressors, to the compressing of gaseous fluids at more or less high pressures, and of course it may be also used as an exhauster as well as a liquid-pump, in which case, as above stated, slip would be avoided and the pump could be worked at a high velocity.

I declare that what I claim in respect of the herein-described invention is—

1. In a fluid compressor, pump, or motor, valves for controlling the flow of fluid to and from the cylinder; a valve-actuating cylinder and piston operated by fluid under pressure connected with said valves; detents working in connection with said valves for controlling the time of movement of same, and mechanism operated from the compressor, pump or motor, adapted to operate said detents; substantially as set forth.

2. In a fluid compressor pump or motor, a separate inlet and outlet valve connected with the cylinder end thereof, for controlling the flow of fluid to and from same respectively; a valve-actuating cylinder and piston, operated by fluid under pressure, connected with each of said valves; detents working in connection with each of said cylinders and pistons and valves for controlling the time of movement of same; and cams adapted to operate said detents; substantially as set forth.

3. In a fluid compressor pump or motor, the combination with the end of a cylinder thereof, of separate inlet and outlet valves to control the flow of fluid to and from said cylinder; a spindle connected with each of said valves by which they are vibrated about their axes; a lever on each of said spindles, by which they are worked; a piston and cylinder operated by fluid under pressure connected with each of said levers, two detents working in connection with each of said levers for controlling the forward and backward strokes, respectively, of said levers; and cams connected with and adapted to operate said two detents and release said levers at the required moments; substantially as set forth.

4. The combination with the end of a compressor pump or motor cylinder, of separate inlet and outlet valves $c^2$ and $b^2$ respectively, of grid form; spindles $c$ and $b$ for operating said valves $c^2$ and $b^2$ respectively, about their axes, a lever $c'$ and $b'$ on the spindles $c$ and $b$ respectively; a cylinder $f$ and piston $g$ directly connected with each of said levers $c'$ $b'$ by which they are separately operated; double detents $j$ working in connection with the free end of the levers $c'$ $b'$, and adapted to be moved into and out of the path of said levers; levers $k$ connected with and adapted to operate said detents; and cams $m$ on the cam-shaft $o$, adapted to operate said levers $k$; substantially as set forth.

In witness whereof I have hereunto set my hand in presence of two witnesses.

JAMES ALGER COOMBS.

Witnesses:
 JNO. W. BROWN,
 FRANK. E. FLEETWOOD.